(12) United States Patent
Krupa et al.

(10) Patent No.: US 11,505,668 B2
(45) Date of Patent: Nov. 22, 2022

(54) INSULATING PLASTIC FOAMS BASED ON POLYOLEFINS

(71) Applicant: QATAR UNIVERSITY, Doha (QA)

(72) Inventors: Igor Krupa, Doha (QA); Mariam A. Almaadeed, Doha (QA); Anton Popelka, Doha (QA); Patrik Sobolciak, Doha (QA); Miroslav Mrlik, Doha (QA)

(73) Assignee: QATAR UNIVERSITY, Doha (QA)

( * ) Notice: Subject to any disclaimer, the term of this patent is extended or adjusted under 35 U.S.C. 154(b) by 225 days.

(21) Appl. No.: 15/937,596

(22) Filed: Mar. 27, 2018

(65) Prior Publication Data

US 2018/0291166 A1 Oct. 11, 2018

Related U.S. Application Data (60) Provisional application No. 62/481,936, filed on Apr. 5, 2017.

(51) Int. Cl.
| | |
|---|---|
| C08J 9/12 | (2006.01) |
| C08J 9/36 | (2006.01) |
| C08J 9/00 | (2006.01) |
| C08J 3/24 | (2006.01) |
| C08J 9/06 | (2006.01) |
| B32B 5/18 | (2006.01) |

(52) U.S. Cl.
CPC ............ *C08J 9/0009* (2013.01); *B32B 5/18* (2013.01); *C08J 3/247* (2013.01); *C08J 9/0014* (2013.01); *C08J 9/06* (2013.01); *C08J 9/12* (2013.01); *C08J 9/365* (2013.01); *C08J 2201/022* (2013.01); *C08J 2201/026* (2013.01); *C08J 2201/03* (2013.01); *C08J 2203/06* (2013.01); *C08J 2203/08* (2013.01); *C08J 2205/044* (2013.01); *C08J 2323/06* (2013.01); *C08J 2323/08* (2013.01); *C08J 2323/12* (2013.01); *C08J 2323/14* (2013.01)

(58) Field of Classification Search
CPC ....... B32B 5/18; B32B 15/046; B32B 27/065; B32B 27/16; B32B 27/26; B32B 3/26; B32B 5/20; B32B 2250/02; B32B 2255/10; B32B 2255/205; B32B 2266/025; B32B 2307/302; B32B 2307/518; B32B 2307/72; B32B 2307/732; C08J 3/247; C08J 9/0009; C08J 9/0014; C08J 9/06; C08J 9/12; C08J 9/365; C08J 2201/022; C08J 2201/026; C08J 2201/03; C08J 2203/06; C08J 2203/08; C08J 2205/044; C08J 2323/06; C08J 2323/08; C08J 2323/12; C08J 2323/14

See application file for complete search history.

(56) References Cited

U.S. PATENT DOCUMENTS

| 3,230,191 | A |  | 1/1966 | Roedel | |
|---|---|---|---|---|---|
| 3,608,009 | A | * | 9/1971 | Changani | D01D 5/423 264/51 |
| 3,635,849 | A |  | 1/1972 | Hanson | |
| 5,098,976 | A |  | 3/1992 | Uryu et al. | |
| 5,198,271 | A | * | 3/1993 | Ishii | C08J 9/365 427/244 |
| 5,290,904 | A |  | 3/1994 | Colvin et al. | |
| 5,455,392 | A | * | 10/1995 | Preu | H01F 27/327 336/205 |
| 5,851,338 | A |  | 12/1998 | Pushaw | |
| 6,114,025 | A | * | 9/2000 | DeVaudreuil | B32B 5/18 428/319.9 |
| 6,376,059 | B1 | * | 4/2002 | Anderson | B29C 44/08 428/314.8 |

FOREIGN PATENT DOCUMENTS

| CN | 103012552 | * | 5/2013 |
|---|---|---|---|
| EP | 0124972 A2 | | 11/1984 |
| WO | WO 2007/140008 A2 | | 12/2007 |
| WO | WO 2012/083972 A1 | | 6/2012 |

OTHER PUBLICATIONS

Almanza, et al. Applicability of the Transient Plane Source Method To Measure the Thermal Conductivity of Low-Density Polyethylene Foams, J. Polym. Sci., Part B, Polymer Physics, 42,1226-1234, 2004.*
Machine translation CN 103102552, May 2013.*
Almaadeed, et al: "Effect fo waste wax and chain structure on the mechanical and physical properties of polyethylene", Arabian Journal of Chemistry 2015, vol. 8, pp. 388-399 (available online Jan. 21, 2014).
Coquard, et al: "Analysis of the hot-disk technique applied to low-density insulating materials", International Journal of Thermal Sciences 2013, vol. 65, pp. 242-253.
Ilcikova, et al: "Viscoelastic and photo-actuation studies of composites based on polystyrene-grafted carbon nanotubes and styrene-b-isoprene-b-styrene block copolymer", Polymer 2014, vol. 55, pp. 211-218.
Ilcikova, et al: "Influence of surface modification of carbon nanotubes on interactions with polystyrene-b-polyisoprene-b-polystyrene matrix and its photo-actuation properties", Polymers Advanced Technologies 2014, 9999, DOI: 0.10002/pat.3324.
Kenisarin, et al: "Thermophysical properties of some organic phase change materials for latent heat storate. A review.", Solar Energy 2014, vol. 107, pp. 553-575.
Kenisarin, et al: "Solar energy storage using phase change materials", Renewable and Sustainable Energy Reviews 2007, vol. 11, No. 9, pp. 1913-1965.
Krupa, et al: "Phase change materials based on low-density polyethylene/paraffin wax blends", European Polymer Journal 2007, vol. 43, pp. 4695-4705.

(Continued)

*Primary Examiner* — Irina S Zemel
(74) *Attorney, Agent, or Firm* — Squire Patton Boggs (US) LLP (57) ABSTRACT

Embodiments of the present invention encompass methods of forming a foamed polyolefin and articles and materials of the foamed polyolefin. The foamed materials and articles may be used in applications requiring thermal insulation.

18 Claims, 6 Drawing Sheets

(56) References Cited

OTHER PUBLICATIONS

Kuboki, et al: "Mechanical properties and foaming behavior of cellulose fiber reinforced high-density polyethylene composites", Polymer Engineering and Science 2009, vol. 49, No. 11, pp. 2179-2188.

Li, et al: "Preparation and characterization fo a series of diol di-stearates as phase change heat storage materials", Materials Letters 2007, vol. 61, pp. 4325-4328.

Molefi, et al: "Investigation of Thermally conducting phase change materials based on polyethylene/wax blends filled with copper particles", Journal Applied Polymer Science 2010, vol. 116, pp. 1766-1774.

Murray, et al: "The effects of high energy electron beam irradiation on the thermal and structural properties of low density polyethylene", Radiation Chemistry and Physics, 81(8), Aug. 2012, 962-966.

Sari, et al: "Synthesis, characterization, thermal properties of a series of stearic acid esters as novel solid-liquid phase change materials", Materials Letters 2009, vol. 63, pp. 1213-1216.

United States Plastics Corp. "What are the differences between HDPE, LDPE, XLPE, LLDPE, and UHMWPE?", Aug. 13, 2008, 1 page.

Wang, et al: "Preparation, stability and mechanical property of shape-stabilized phase change materials", Energy and Buildings 2014, vol. 77, pp. 11-16.

Waqas, et al: "Phase change material (PCM) storage for free cooling of buildings—A review.", Renewable and Sustainable Energy Reviews 2013, vol. 18, pp. 607-625.

You, et al: "Polyurethane foam containing microencapsulated phase change material with styrene-divinylbenzene co-polymer shell", Journal Material Science 2009, vol. 44, pp. 3141-3147.

You, et al: "Effects of microencapsulated phase change materials granularity and het treatment conditions on the structure and performance of polyurethane foams", Modern Applied Science 2008, vol. 2, No. 4, pp. 44-51.

Yuan, et al: "Preparation and thermal characterization of capric-myristic-palmitic acid/expanded graphite composite as phase change material for energy storage", Materials Letters 2014, vol. 125, pp. 154-157.

Zalba, et al: "Review on thermal energy storage with phase change: materials, heat transfer analysis and applications", Applied Thermal Engineering 2003, vol. 23, pp. 251-283.

\* cited by examiner

INSULATING PLASTIC FOAMS BASED ON POLYOLEFINS

This application claims the benefit of U.S. Provisional Patent Application No. 62/481,936, filed Apr. 5, 2017, which is incorporated by reference herein in its entirety, and expressly includes incorporation of any drawings.

BACKGROUND

Field

This invention relates to materials science, and more specifically, methods of manufacturing insulating foam materials based on polyofefins.

Background

There is a need for insulating materials in buildings, automobiles, and containers. The insulating materials may also be used in fabrics.

INCORPORATION BY REFERENCE

All publications, patents, and patent applications mentioned in this specification are herein incorporated by reference to the same extent as if each individual publication, patent, or patent application was specifically and individually indicated to be incorporated by reference, and as if each said individual publication, patent, or patent application was fully set forth, including any figures, herein. To the extent that any definition provided herein conflicts with a definition provided in any of the incorporated by reference materials, the definition provided herein controls.

SUMMARY

Embodiments of the present invention encompass methods of manufacturing a foam including, but not limited to including, a polyolefin and a phase change material, and materials and articles formed from the foamed material. Embodiments of the present invention encompass methods of manufacturing an article or material by forming a blend composition, the blend composition comprising a polyolefin, a phase change material, an optional cross-linking agent, and optionally an additive material; cross-linking the polyolefin to form a cross-linked intermediate composition; foaming the cross-linked intermediate composition to form a foamed article or material. In some embodiments, the blend composition is processed prior to being cross-linked. In some embodiments, the blend composition is process prior to being cross-linked and at least for some time during cross-linking.

Embodiments of the present invention encompass methods of manufacturing an article or material by forming a blend composition by executing an operation comprising combining a polyolefin, a phase change material, an optional cross-linking agent, and optionally an additive material; executing an operation comprising cross-linking the polyolefin to form a cross-linked intermediate composition; executing an operation comprising foaming the cross-linked intermediate composition to form a foamed article or material. In some embodiments, the blend composition is processed prior to being cross-linked.

Embodiments of the present invention encompass articles or materials of a foamed cross-linked polyolefin material including a phase change material with a porosity of 35% to 98% by volume. In some embodiments, the polyolefin is low density polyethylene, linear low density polyethylene, high density polyethylene, polypropylene, and blends thereof. In some embodiments, the phase change material is n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, n-Heptadecane, n-Hexadecane, n-Pentadecane, n-Tetradecane, n-Tridecane, or a combination thereof.

DETAILED DESCRIPTION

The term "as used herein" applies to the entire disclosure and expressly includes the specification, claims, and drawings.

As used herein, the use of the singular includes the plural and vice versa unless expressly stated to be otherwise. That is, "a," "an" and "the" refer to one or more of whatever the word modifies. For example, "an article" may refer to one articles, two articles, etc. By the same token, words such as, without limitation, "articles" would refer to one article as well as to a plurality of articles unless it is expressly stated or obvious from the context that such is not intended.

As used herein, the phrases "any combination of" and "a combination of" followed by a list joined by the conjunction "and," means any combination of two or more members of the group where the group members are the members of the list joined by the conjunction "and." As a non-limiting example, "any combination of A, B, C, and D" encompasses the following combinations: A and B; A and C; A and D; B and C; B and D; C and D; A, B, and C; A, B, and D; A, C, and D; B, C, and D; A, B, C, and D. Similarly, the phrase "A, B, C, D, or any combination thereof" encompasses an individual member (A, B, C, D) or any combination of A, B, C, and D, as outlined above. The phrase "A, B, C, D, or a combination thereof" encompasses an individual member (A, B, C, D) or any combination of A, B, C, and D, as outlined above. Similarly, the phrase "X is selected from the group consisting of A, B, C, D, and combinations thereof" (or a variant such as "X is selected from the group consisting of A, B, C, D, and all combinations thereof") encompasses X being an individual member of the group (A, B, C, D) or any combination of the A, B, C, and D, as outlined above.

As used herein, the phrase "and/or" means a combination or an individual member. As a non-limiting example, "X is A, B, and/or C" encompasses the following possibilities: X is A; X is B; X is C; X is any combination of A, B, and C (A and B; A and C; B and C; A, B, and C).

As used herein, words of approximation such as, without limitation, "about," "substantially," "essentially," and "approximately" mean that the word or phrase modified by the term need not be exactly that which is written but may vary from that written description to some extent. The extent to which the description may vary from the literal meaning of what is written, that is the absolute or perfect form, will depend on how great a change can be instituted and have one of ordinary skill in the art recognize the modified version as still having the properties, characteristics and capabilities of the modified word or phrase. With the preceding discussion in mind, a numerical value herein that is modified by a word of approximation may vary from the stated value by ±15% in some embodiments, by ±10% in some embodiments, by ±5% in some embodiments, or in some embodiments, may be within the 95% confidence interval. For physical measurements or variables, the numbers are not absolute but are subject to experimental measurement errors and normal variation.

As used herein, any ranges presented are inclusive of the end-points. For example, "a temperature between 10° C. and 30° C." or "a temperature from 10° C. to 30° C." includes 10° C. and 30° C., as well as any temperature in between. In addition, throughout this disclosure, various aspects of this invention may be presented in a range format. The description in range format is merely for convenience and brevity and should not be construed as an inflexible limitation on the scope of the invention. Accordingly, the description of a range should be considered to have specifically disclosed all the possible subranges as well as individual numerical values within that range. As an example, a description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. Unless expressly indicated, or from the context clearly limited to integers, a description of a range such as from 1 to 6 should be considered to have specifically disclosed subranges 1.5 to 5.5, etc., and individual values such as 3.25, etc. that is non-integer individual values and ranges beginning with, ending with or both beginning with and ending with a non-integer value(s). This applies regardless of the breadth of the range.

As used herein, a range may be expressed as from "about" one particular value and/or to "about" another particular value, for example from about 5 to about 10. When such a range is expressed, another embodiment is included, the embodiment being from one particular value and/or to the other particular value. Similarly when values are expressed as approximations by use of the antecedent "about," it will be understood that the particular value forms another embodiment. As an example, the disclosure of the range "about 5 to about 10" also discloses the range "5 to 10." Similarly, the disclosure of "a temperature of about 100° C." is equivalent to also disclosing "a temperature of 100° C."

As used herein, a "polymer" refers to a molecule comprised of, actually or conceptually, repeating "constitutional units." The constitutional units derive from the reaction of monomers. As a non-limiting example, ethylene ($CH_2=CH_2$) is a monomer that can be polymerized to form polyethylene, $CH_3CH_2(CH_2CH_2)_nCH_2CH_3$ (where n is an integer), wherein the constitutional unit is —$CH_2CH_2$—, ethylene having lost the double bond as the result of the polymerization reaction. Although poly(ethylene) is formed by the polymerization of ethylene, it may be conceptually thought of being comprised of the —$CH_2$— repeating unit, and thus conceptually the polymer could be expressed by the formula $CH_3(CH_2)_mCH_3$ where m is an integer, which would be equal to 2n+2 for the equivalent number of ethylene units reacted to form the polymer. A polymer may be derived from the polymerization of two or more different monomers and therefore may comprise two or more different constitutional units. Such polymers are referred to as "copolymers." "Terpolymers" are a subset of "copolymers" in which there are three different constitutional units. The constitutional units themselves can be the product of the reactions of other compounds. Those skilled in the art, given a particular polymer, will readily recognize the constitutional units of that polymer and will equally readily recognize the structure of the monomer or materials from which the constitutional units derive. Polymers may be straight or branched chain, star-like or dendritic, or one polymer may be attached (grafted) onto another. Polymers may have a random disposition of constitutional units along the chain, the constitutional units may be present as discrete blocks, or constitutional units may be so disposed as to form gradients of concentration along the polymer chain. Polymers may be cross-linked to form a network.

As used herein, a polymer has a chain length of 50 constitutional units or more, and those compounds with a chain length of fewer than 50 constitutional units are referred to as "oligomers." As used to differentiate between oligomers and polymers herein, the constitutional unit will be the smallest unique repeating unit. For example, for poly(ethylene) the constitutional unit used to count the "number" of constitutional units would be the number of —$CH_2$— units, even though conventionally the constitutional unit is stated to be —$CH_2CH_2$— because it is always derived from the reaction of ethylene.

As used herein, a "crosslink" refers to a joining of two separate chains of a polymer by reaction of functional groups on the polymer with functional groups on another polymer chain or on a multifunctional cross-linking entity. A "multifunctional crosslinking entity" is a compound having two or more functional groups that are capable of reacting with a functional group appended to or along the polymer backbone, or in some instances, to the terminal end of a polymer. In some cases, the "functional group" on a polymer backbone is created by extraction of a hydrogen by a peroxide creating a radical in the polymer backbone which can react with another radical along the backbone of another polymer chain. In some cases radiation (for example and without limitations, gamma radiation and high-energy electron beams), can also create cross-links in a polymer. Typically, the cross-link joins non-terminal functional groups such that at the point where the cross-link joins the polymer, at least three chains emanate. It is also possible for the functional groups involved in a cross linking reaction to be disposed at the ends of the polymer chains, but if all the cross-linking agents are only bi-functional and all functional groups exist only a the end of the polymer chains, only chain extension would result. When there are multiple cross-links along the backbone of a number of polymer chains, the polymer forms a network (a cross-linked polymer network).

"Molecular weight" can refer to the molecular weight of individual segments, blocks, or polymer chains. "Molecular weight" can also refer to weight average molecular weight or number average molecular weight of types of segments, blocks, or polymer chains.

The number average molecular weight (Mn) is the common, mean, average of the molecular weights of the individual segments, blocks, or polymer chains. It is determined by measuring the molecular weight of N polymer molecules, summing the weights, and dividing by N:

$$M_n = \frac{\sum_i N_i M_i}{\sum_i N_i}$$

where $N_i$ is the number of polymer molecules with molecular weight $M_i$. The weight average molecular weight is given by:

$$M_w = \frac{\sum_i N_i M_i^2}{\sum_i N_i M_i}$$

where $N_i$ is the number of molecules of molecular weight $M_i$. Another commonly used molecular weight average is the viscosity average molecular weight which may be express as:

$$M_v = \left[\frac{\sum_i M_i^{(1+a)} N_i}{\sum_i M_i N_i}\right]^{1/a}$$

where $N_i$ is the number of polymer molecules with molecular weight $M_i$, and a is typically less than 1, and is related to intrinsic viscosity.

As used herein, the term "wt. %" means a percent (%) by weight. Similarly the term "wt %" means a percent (%) by weight.

Embodiments of the present invention encompass methods of manufacturing a foam including, but not limited to including, a polyolefin and a phase change material, and materials and articles formed from the foam material. Embodiments of the present invention encompass methods of manufacturing an article or a material where the methods include forming a blend composition by executing an operation the operation including combining a polyolefin, a phase change material and an optional cross-linking agent, and optionally an additive material; then executing an operation where the operation includes cross-linking the polyolefin such that a cross-linked intermediate composition is formed; and then executing an operation that includes foaming the cross-linked intermediate composition to form a foamed article or a foamed material. Embodiments of the present invention encompass methods of manufacturing an article or a material where the methods include forming a blend composition by combining a polyolefin, a phase change material and an optional cross-linking agent, and optionally an additive material; then cross-linking the polyolefin such that a cross-linked intermediate composition is formed; and then foaming the cross-linked intermediate composition to form a foamed article or a foamed material.

Embodiments of the present invention encompass methods of manufacturing an article or a material where the methods include forming a blend composition, the blend composition comprising a polyolefin, a phase change material and an optional cross-linking agent, and optionally an additive material; then cross-linking the polyolefin such that a cross-linked intermediate composition is formed; and foaming the cross-linked intermediate composition to form a foamed article or a foamed material. The cross-linking and foaming operations may overlap.

A polyolefin is a polymer formed from an olefin. According to Encyclopedia Britannia, an olefin is a compound of carbon and hydrogen in which at least one carbon-carbon bond is a double bond. The word "olefin" is synonymous with alkene. A polyolefin may no longer include a double bond after polymerization. As an example, the olefin, ethylene ($CH_2=CH_2$), may be polymerized to form polyethylene, $CH_3CH_2(CH_2CH_2)_nCH_2CH_3$, but polyethylene does not include any double bonds. The polyolefins used in the embodiments of the present invention include linear polyolefins, branched polyolefins, cyclic polyolefins, and combinations thereof. To analyze the different polyethylene structures a High Temperature Gel Permeation Chromatography/Size Exclusion (GPC/SEC)-System can used with Triple Detection (Low Angle Light Scattering, Viscosity Detection and Refractive Index Detection). To analyze the different polyolefin structures a High Temperature Gel Permeation Chromatography/Size Exclusion (GPC/SEC)-System can used with Triple Detection (Low Angle Light Scattering, Viscosity Detection and Refractive Index Detection). In some embodiments, the polyolefins used include only carbon and hydrogen. In some embodiments, the polyolefins used are those where some of the hydrogen atoms are substituted with another atom or group of atoms. In some embodiments, polyolefins used are those where some of the hydrogen atoms are substituted with one type of atom or group and other hydrogen atoms are substituted with another type of atom or group. As an example, without limitation, polyolefins which may be used in the embodiments of the invention include those in which one or more hydrogens are substituted with a halogen such as chloride, bromine, iodine, or a combination thereof (different halogens on substituted for different hydrogen atoms. In some embodiments, the polyolefins used are grafted polyolefins, where another polymer is covalently attached to the backbone of the polymer. Non-limiting examples of grafted polyolefins include polyolefins grafted with maleic-anhydrate, acrylic acid, methacrylic acid, etc.

Non-limiting specific examples of polyolefins that may be used, individually or in combination, in embodiments of the present invention include low density polyethylene, linear low density polyethylene, high density polyethylene, polypropylene, copolymers thereof, and blends thereof. Copolymers thereof refer to copolymers wherein one or more of the constituent monomers is polyethylene and/or polypropylene, and optionally including other constituent monomers. Low density polyethylene has a density of 0.910 to 0.925 g/cm³, and linear low density polyethylene has a density of 0.91 to 0.94 g/cm³. High density polyethylene has a density of 0.941 to 0.965 g/cm³. Ultra-high molecular weight polyethylene has a density of 0.928 to 0.941 g/cm³, but a number average of molecular weight on the order of 2 to 6 million (about 100,000 to 250,000 ethylene monomer units). The low density polyethylene has the most branching. The polyolefins disclosed herein may be used in combination with other polyolefins, including, but not limited to including, those disclosed herein.

In some embodiments, the polyolefin(s) are used in combination with one or more other polymers. In some embodiments, the polyolefin(s) comprise at least 50 wt % of the polymer, that is the sum of all polymers including the polyolefin(s). In some embodiments, the polyolefin(s) comprise at least 60 wt % of the polymer. In some embodiments, the polyolefin(s) comprise at least 70 wt % of the polymer. In some embodiments, the polyolefin(s) comprise at least 75 wt % of the polymer. In some embodiments, the polyolefin(s) comprise at least 80 wt % of the polymer. In some embodiments, the polyolefin(s) comprise at least 85 wt % of the polymer. In some embodiments, the polyolefin(s) comprise at least 90 wt % of the polymer. In some embodiments, the polyolefin(s) comprise at least 95 wt % of the polymer. In some embodiments, the polyolefin(s) comprise at least 98 wt % of the polymer.

A "phase change material" is a substance with a high heat of fusion that is able to release or absorb thermal energy by melting and solidifying at a certain temperature, typically at a phase transition temperature such as at the melting/freezing transition. The choice of a "phase change material" will depend upon the intended use of the material so that a material can be chosen with a phase transition occurring at an appropriate temperature. In some embodiments of the present invention, the phase change material is a material with a melting point between 10° C. and 90° C. In some embodiments of the present invention, the phase change material is a material with a melting point between 22° C. and 90° C., and which is compatible with polyolefins. For compatibility with the polyolefins, paraffin compounds (also known as paraffin waxes) may be suitable phase change materials. Non-limiting specific examples include n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, n-Heptadecane, n-Hexadecane, n-Pentadecane, n-Tetradecane, and n-Tridecane. The phase change materials may be used individually or in combination. The phase change materials disclosed herein may be used in combination with other phase change materials, including, but not limited to including, those disclosed herein. In preferred embodiments a single phase change material is used individually.

In some embodiments of the present invention the phase change material is encapsulated in another material such as a polymer to form a capsule. The capsule may be a microcapsule of a dimension ranging from 100 nanometers (nm) to around 15 to 20 micrometers (μm). The capsule may be larger than a microcapsule, ranging in size from about 20 μm to 2 mm. The dimensions of the encapsulated phase change material will depend upon the dimensions of the final article and/or the use of the foamed material. Non-limiting examples of materials used to encapsulate the phase change material include gelatin. Other non-limiting examples of means of encapsulation include physical methods, such as and without limitation, pan coating, air suspension coating, centrifugal extrusion, vibrational nozzle spray drying, and solvent evaporation), physical-chemical methods, such as and without limitation, ionic gelation, coacervation, sol-gel method, and chemical methods, including but not limited to interfacial polymerization, suspension polymerization, and emulsion polymerization)

In some embodiments of the present invention the phase change material is not encapsulated in another material, but is used without encapsulation. In some embodiments of the present invention the phase change material is used "as is." In some embodiments of the present invention, a combination of phase change material that is encapsulated in another material, and phase change material that is not encapsulated is used.

In some embodiments of the present invention, the weight:weight ratio (and also for the mass:mass ratio) of the phase change material to the polyolefin ranges from about 1:100 to about 2:1, and preferably from about 1:20 to about 1:1. In some embodiments of the present invention, the weight:weight ratio (and also for the mass:mass ratio) of the phase change material to the polyolefin ranges from about 1:15 to about 2:5. In some embodiments of the present invention, the weight:weight ratio (and also for the mass:mass ratio) of the phase change material to the polyolefin ranges from about 1:10 to about 7:10. In some embodiments of the present invention, the above ratios of the phase change material to the polyolefin include the encapsulation material if the phase change material, if it is encapsulated, and in other embodiments of the present invention, the above ratios do not include the encapsulation material if the phase change material, if it is encapsulated.

In some embodiments of the present invention, combining the polyolefin, the phase change material, either encapsulated, unencapsulated, or both, and the cross-linking agent, if present, and the additive material, if present, comprises mixing the polyolefin, the phase change material and the cross-linking agent and the additive material, to the extent that these are present, until homogeneous or substantially homogeneous. In some embodiments, "substantially homogeneous" blend or mix refers to a standard deviation of the concentration of the phase change material for a sample size of at least six samples which is not more than 15% of the mean.

The mixing or combination may be by high shear mixing, or low shear mixing. A non-limiting example of the apparatus that may be used in mixing is the Plasticorder Brabender®. In some embodiments of the present invention, the mixing or combining is executed at a temperature in the range of 100° C. to 180° C. In some embodiments of the present invention, the mixing or combining is executed at a temperature in the range of 80° C. to 220° C. In some embodiments of the present invention, the mixing or combining is executed at a temperature in the range of 110° C. to 170° C. In some embodiments of the present invention, the mixing or combining is executed at a temperature in the range of 120° C. to 180° C.

After the mixing or combing is complete, the cross-linking may be executed. In some embodiments of the present invention, the cross-linking is accomplished by irradiating the blended composition. In some embodiments of the present invention, the irradiation to cross-link the composition uses gamma radiation. In some embodiments of the present invention, the irradiation to cross-link the composition uses high energy (about 300 keV to about 3 MeV) electron beams. In some embodiments of the present invention, the cross-linking is accomplished by use of a cross-linking agent, and thus the optional cross-linking agent is present and part of the blended composition. In some embodiments of the present invention, the cross-linking agent is a peroxide or other compound that can extract a hydrogen from the backbone of the polymer creating a radical in the backbone of the polymer. Non-limiting examples of cross-linking agents include dicumylperoxide. In some embodiments, the weight:weight ratio (and also the mass:mass ratio) of the cross-linking agent to the polyolefin may range from about 1:10000 to about 1:20, and preferably from about 1:5000 to about 1:50. In some embodiments, the weight:weight ratio (and also the mass:mass ratio) of the cross-linking agent to the polyolefin may range from about 1:200 to about 1:19. The weight: weight ratio (and also the mass:mass ratio) of the cross-linking agent to the sum of the weight (or mass) of the polyolefin and the phase change material may range from about 1:10000 to about 1:20, and preferably from about 1:5000 to about 1:50. In some embodiments, the weight:weight ratio (and also the mass: mass ratio) of the cross-linking agent to the sum of the weight (or mass) of the polyolefin and the phase change material may be in the range of about 1:60 to about 1:120, and in some embodiments, the ratio is about 1:89. In some embodiments of the present invention, the above ratios of the cross-linking agent to the sum of the polyolefin and the phase change material include the encapsulation material of the phase change material, if it is encapsulated, and in other embodiments of the present invention, the above ratios do not include the encapsulation material of the phase change material, if it is encapsulated. The cross-linking agents disclosed herein may be used individually, or in combination with other cross-linking agents, including, but not limited to including, those disclosed herein.

In some embodiments of the present invention, the cross-linking agent is present and the cross-linking is executed by exposing the blend composition (after blending) to an elevated temperature (above room temperature), in the range of 100° C. to 200° C., for a sufficient time to cross-link the polyolefin. In some of the embodiments of the present invention using a cross-linking agent, the temperature of the exposure depends upon the type of cross-linking agent used. In some embodiments using a cross-linking agent, the sufficient time for cross-linking is in the range of 1 minute to 60 minutes. In some embodiments using a cross-linking agent, the cross-linking is executed by exposing the blend composition (after blending) to an elevated temperature (above room temperature), in the range of 60° C. to 200° C. for a sufficient time, and in some embodiments, the sufficient time for cross-linking is in the range of at least 2 minutes and not more than 90 minutes. The temperature and time for cross-linking is a function of the type of peroxide used for the cross-linking reaction. In some embodiments using a cross-linking agent, the sufficient time for cross-linking is in the range of 5 minutes to 30 minutes. In some embodiments using a cross-linking agent, exposing the blend composition (after blending) to an elevated temperature (above room temperature) to cross-link the composition occurs in an environment of elevated pressure and/or containment, and the elevated pressure may be from about 1 to about 10 MPa. In some cases, the elevated pressure is about 5 MPa. A Pa is a Pascal which is a pressure unit of $N/m^2$ or $Kg/(m*s^2)$ where * represents multiplication (or $N*m^{-2}$ or $Kg*m^{-1}*s^{-2}$), and M is Mega or $1*10^6$.

In some embodiments, the efficiency of the cross-linking is at least 80% where efficiency is the weight % of the polymer that is part of the cross-linked network. In other words, if the efficiency of the cross-linking is 90%, then 10 wt % of the polymer can be extracted and removed. In some embodiments, the efficiency of the cross-linking is at least 85%. In some embodiments, the efficiency of the cross-linking is at least 90%. In some embodiments, the efficiency of the cross-linking is at least 95%. In some embodiments, the efficiency of the cross-linking refers to cross-linking of the polyolefin(s) and excludes other polymers, if present. In some embodiments, the efficiency of the cross-linking refers to cross-linking of all of the polymers capable of being cross-linked.

In some embodiments of the present invention, an additive material is present and the additive material is a blowing agent, and the foaming of the composition utilizes the blowing agent. In some embodiments of the present invention, the blowing agent is decomposed to volatile components which form pores in the cross-linked composition when released from the composition. In some embodiments of the present invention, a blowing agent is present, and the decomposition of the blowing agent and release of the volatile components to foam the composition occur in different operations. As a non-limiting example, the blend composition may be cross-linked with a cross-linking agent by exposure to an elevated temperature which allows the cross-linking to occur and also decomposes the blowing agent, but occurs under conditions of containment of the volatile components formed by decomposition which occurs at an elevated pressure. As a non-limiting example, the blend composition may be cross-linked after or both during and after molding the composition, such as and without limitation, compression molding. Thus, after cross-linking at an elevated temperature under pressure, such and and, without limitation, during molding, the cross-linked intermediate composition may be allowed to cool to room temperature, and then subsequently heated to the same elevated temperature or a different elevated temperature without constraint and at standard atmospheric pressure (about 1 atmosphere) which allows the volatile components to be released from the cross-linked intermediate composition creating the foamed material or the article containing pores. The blowing agents disclosed herein may be used individually, or in combination with other blowing agents, including, but not limited to including, those disclosed herein.

In some embodiments of the present invention, the weight:weight ratio (and also for the mass:mass ratio) of the blowing agent to the polyolefin may range from about 1:10000 to about 1:20, and preferably from about 1:5000 to about 1:50. In some embodiments of the present invention, the weight:weight ratio (and also for the mass:mass ratio) of the blowing agent to the polyolefin may range from about 1:100 to about 1:5. In some embodiments of the present invention, the weight:weight ratio (and also for the mass: mass ratio) of the blowing agent to the polyolefin may be from about 1:58 to about 1:11. In some embodiments of the present invention, the weight:weight ratio (and also for the mass:mass ratio) of the blowing agent to the sum of the weight (or mass) of the polyolefin and the phase change material may range from about 1:10000 to about 1:20, and preferably from about 1:5000 to about 1:50. In some embodiments of the present invention, the weight:weight ratio (and also for the mass:mass ratio) of the blowing agent to the sum of the weight (or mass) of the polyolefin and the phase change material may range from about 1:100 to about 1:10. In some embodiments of the present invention, the weight:weight ratio (and also for the mass:mass ratio) of the blowing agent to the sum of the weight (or mass) of the polyolefin and the phase change material may range from about 1:60 to about 1:17. In some embodiments of the present invention, the above ratios of the blowing agent to the sum of the polyolefin and the phase change material include the encapsulation material of the phase change material, if it is encapsulated, and in other embodiments of the present invention, the above ratios of the blowing agent to the sum of the polyolefin and the phase change material do not include the encapsulation material of the phase change material, if it is encapsulated.

In some embodiments of the present invention, at least 98% of the blend composition by weight (or by mass) consists of a polyolefin, and an encapsulated phase change material, an unencapsulated phase change material, or a combination of an encapsulated phase change material, an unencapsulated phase change material. In some embodiments of the present invention, at least 99.5% of the blend composition by weight (or by mass) consists of a polyolefin, a cross-linking agent, and an encapsulated phase change material, an unencapsulated phase change material, or a combination of an encapsulated phase change material and an unencapsulated phase change material. In some embodiments of the present invention, at least 99.5% of the blend composition by weight (or by mass) consists of a polyolefin, a cross-linking agent, a blowing agent, and an encapsulated phase change material, an unencapsulated phase change material, or a combination of an encapsulated phase change material, an unencapsulated phase change material.

In some embodiments of the present invention, foaming the cross-linked intermediate composition to form a foamed article or a foamed material comprises use of physical foaming, and thus, no blowing agent is part of the blend composition. In some embodiments of the present invention, physical foaming of the cross-linked intermediate composition includes the use of a supercritical fluid. In some embodiments of the present invention, the use of a supercritical fluid includes executing an operation in which the cross-linked intermediate composition is exposed to a supercritical fluid (where the pressure is above the supercritical pressure of the fluid at the temperature of the exposure) for at least 2 minutes, and then the pressure is suddenly changed to a lower pressure, resulting in a change in the solubility of the fluid in the composition, and foaming when the fluid converts to a gas and is released from the cross-linked composition. In some embodiments of the present invention, the use of a supercritical fluid includes exposing the cross-linked intermediate composition to a supercritical fluid (where the pressure is above the supercritical pressure of the fluid at the temperature of the exposure) for at least 2 minutes, and then the pressure is suddenly changed to a lower pressure, resulting in a change in the solubility of the fluid in the composition, and foaming when the fluid converts to a gas and is released from the cross-linked composition. In some embodiments of the present invention, the time of exposure to the supercritical fluid is at least 30 seconds and not more than 12 hours. In some embodiments of the present invention, the lower pressure is a pressure below the supercritical pressure at the temperature of the exposure. In some embodiments of the present invention, the lower pressure is a pressure at least 5% below the supercritical pressure of the fluid at the temperature of the exposure. In some embodiments of the present invention, the lower pressure is a pressure at least 10% below the supercritical pressure of the fluid at the temperature of the exposure. In some embodiments of the present invention, the lower pressure is a pressure at least 15% below the supercritical pressure of the fluid at the temperature of the exposure. Non-limiting examples of compounds that may be used in the super-critical state as supercritical fluids include carbon dioxide, nitrogen, argon, ethane, water, isopropanol, ammonia, acetone or a combination thereof. In some embodiments of the present invention, foaming the cross-linked intermediate composition to form a foamed article or a foamed material comprises executing an operation comprising physical foaming. In some embodiments of the present invention, foaming the cross-linked intermediate composition to form a foamed article or a foamed material comprises physical foaming using a fluid which is not supercritical, but is at an elevated pressure, and a non-limiting example is liquid carbon dioxide.

In some embodiments of the present invention, foaming the cross-linked intermediate composition to form a foamed article or a foamed material comprises use of both physical foaming and the use of a blowing agent.

In the embodiments of the present invention, the blend composition may include other materials beneficial to the composition, and both methods and articles including one or more other beneficial materials are included in the scope of the invention.

In some embodiments of the present invention, the blend composition is processed prior to cross-linking. Non-limiting examples of processing include compression molding, injection molding, extrusion, or a combination thereof. In some embodiments of the present invention, forming the blend composition, cross-linking the blend composition, and foaming the cross-linked intermediate composition occur as separate operations. In other words, cross-linking does not occur during the blending, and so forth. In some embodiments of the present invention, forming the blend composition, processing the blend composition, cross-linking the blend composition, and foaming the cross-linked intermediate composition are separate operations. In some embodiments of the present invention, the processing and cross-linking may occur at least partially simultaneously. In some embodiments of the present invention, at least one operation of the group blending, processing, cross-linking, and foaming, may at least partially overlap one of the other operations. As a non-limiting example, after the blend composition is formed it may be placed in a mold under pressure and at a temperature above room temperature. During the time it is in the mold it is being shaped but cross-linking may also begin to occur. In some embodiments, room temperature is 18° C. to 25° C., and in some embodiments, room temperature is 21° C. to 24° C.

In some embodiments of the present invention, a film is laminated to at least a portion of the exterior surface of the foamed article, or foamed material. One of skill in the art will be able to determine the exterior surface of an article or material. As a non-limiting example, a cube of foamed material would have 6 sides and lamination of a film over part or all of one side would constitute lamination on at least a portion of the exterior surface even if a pore were open at the surface and the film did not touch all of the inside of the pore. In some embodiments, "at least a portion of the exterior surface" is the entire exterior surface. In some embodiments of the present invention, the surface of the article to be laminated is irradiated with low plasma prior to lamination of the film. In some embodiments of the present invention, the entire exterior surface is laminated with a film. In some embodiments of the present invention, only a portion of the exterior surface is laminated with a film. The film may be a polymer film, a metal film, or a multilaminate film with layers of different materials. More than one film may be laminated to at least a portion of the exterior surface of the foamed article or foamed material. In some embodiments of the present invention, the lamination film is an aluminized MYLAR® film of about 0.020 mm to 0.21 mm, where MYLAR® is a biaxially oriented polyethylene terephthalate polymer film. In some embodiments of the present invention, the total thickness of all of the laminated film(s) is/are of a thickness of about 0.010 mm to 0.51 mm. In some embodiments, different film types are laminated to different portions of the exterior surface of the article and the different films may partially overlap or may not overlap at all.

Embodiments of the present invention also encompass the materials and articles made by the above methods. In some embodiments of the present invention, the material or article of a porosity of 35% to 98% by volume, and comprises a cross-linked polyolefin and a phase change material. In some embodiments of the present invention, the phase change material is of a lower weight average molecular weight than the weight average molecular weight of the polyolefin (prior to cross-linking). The porosity may be determined based upon the density of the foamed material as compared to the density of the unfoamed material, or fraction of pores=1−(density foamed material/density unfoamed material), and the % porosity=100%*fraction of pores. In some embodiments of the present invention, the porosity of the material or article is between 40% and 95%. In some embodiments of the present invention, the porosity of the material or article is between 45% and 90%. In some embodiments of the present invention, the porosity of the material or article is between 50% and 85%. In some embodiments of the present invention, the porosity of the material or article is between 60% and 80%.

In some embodiments of the present invention, the pores of the material or article are of about 100 μm to 200 μm in diameter. In some embodiments, the pore size is determined by BET (Brunauer, Emmett and Teller) analysis, XRD (X-ray diffraction), or a combination thereof. In some embodiments, the pore size is can be determined directly by SEM (scanning electron microscopy) or Optical profilometry technique. Average pore size and pore size distribution for open pores is subject to some errors in the measurement.

In some embodiments of the present invention, the insoluble portion of the formed article or foamed material (the cross-linked portion), prior to any optional film lamination, is in the range of 10 percent by weight (or percent by mass) to 50 percent by weight (or percent by mass). In some embodiments of the present invention, the insoluble portion of the formed article or foamed material (the cross-linked portion), prior to any optional film lamination, is in the range of 12 percent by weight (or percent by mass) to 45 percent by weight (or percent by mass). In some embodiments of the present invention, the insoluble portion of the formed article or foamed material (the cross-linked portion), prior to any optional film lamination, is in the range of 15 percent by weight (or percent by mass) to 40 percent by weight (or percent by mass). In some embodiments of the present invention, the insoluble portion of the formed article or foamed material (the cross-linked portion), prior to any optional film lamination, is in the range of 20 percent by weight (or percent by mass) to 35 percent by weight (or percent by mass).

In some embodiments of the present invention, the polyolefin of the material or article includes low density polyethylene, linear low density polyethylene, high density polyethylene, polypropylene, and copolymers thereof, and also including any blends of the foregoing. In some embodiments of the present invention, the polyolefin of the material or article is low density polyethylene, linear low density polyethylene, high density polyethylene, polypropylene, and copolymers thereof, and also including any blends of the foregoing.

In some embodiments of the present invention, the "phase change material" is encapsulated. In some embodiments of the present invention, the "phase change material" is not encapsulated. Whether encapsulated or not encapsulated, in some embodiments of the present invention, the phase change material is a material with a melting point between 22° C. and 90° C., and which is compatible with polyolefins. Whether encapsulated or not encapsulated, in some embodiments of the present invention, the phase change material is a paraffin wax. Whether encapsulated or not encapsulated, in some embodiments of the present invention, the phase change material comprises n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, n-Heptadecane, n-Hexadecane, n-Pentadecane, n-Tetradecane, n-Tridecane, or a combination thereof. Whether encapsulated or not encapsulated, in some embodiments of the present invention, the phase change material is n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, n-Heptadecane, n-Hexadecane, n-Pentadecane, n-Tetradecane, n-Tridecane, or a combination thereof.

In some embodiments of the present invention, the foamed article or foamed material is laminated on at least a portion of the exterior surface with a film. In some embodiments, the entire exterior surface of the foamed article or foamed material is laminated with a film. In some embodiments, the entire exterior surface of an article is laminated with a film. The laminated film may be a polymer film, a metal film, a multilaminate film with layers of different materials. In some embodiments of the present invention, the lamination film is an aluminized MYLAR® film where MYLAR® is a biaxially oriented polyethylene terephthalate polymer film. In some embodiments of the present invention, the total thickness of all film layer(s) laminated is in the range of about 0.001 mm to 5 mm. In some embodiments of the present invention, the total thickness of all film layer(s) laminated is in the range of about 0.010 mm to 0.51 mm.

In some embodiments of the present invention, the foamed article or foamed material, prior to the optional lamination of any exterior films, may have a thermal conductivity in the range of about 0.07 to about 0.12 W/(m*K), and a thermal diffusivity in the range of about 18 to 26 mm$^2$ s$^{-1}$. In some embodiments of the present invention, the foamed article or foamed material, prior to the optional lamination of any exterior films, has stable mechanical and/or thermal properties to provide an excellent stability of prepared foam materials under cyclic heating and dynamic mechanical stresses and these characteristics were shown with by DSC and DMA, such that the properties do not change by more than 10% after 20 temperature cycles where each temperature cycle encompasses the transition temperature of the phase change material of the foamed article or foamed material and at least 10° C. on each side. As a non-limiting example, if the transition temperature is 40° C., then each temperature cycle encompasses at least the range 30° C. to 50° C.

In some embodiments of the present invention, the foamed article or foamed material is a component of another article.

Some non-limiting embodiments of the invention follow:

Embodiment 1

Embodiments encompass a method of manufacturing an article or material by forming a blend composition, the blend composition comprising a polyolefin, a phase change material and an optional cross-linking agent, and optionally an additive material; cross-linking the polyolefin or executing an operation comprising cross-linking the polyolefin to form a cross-linked intermediate composition; and foaming the cross-linked intermediate composition or executing an operation comprising foaming the cross-linked intermediate composition to form a foamed article or material.

Embodiment 2

In some embodiments, such as that in embodiment 1 above, forming the blend composition comprising the polyolefin, the phase change material, the cross-linking agent, if present, and the additive material, if present, comprises mixing the polyolefin, the phase change material, and the cross-linking agent, if present, and the additive material, if present, until homogeneous or substantially homogeneous.

Embodiment 3

In some embodiments, such as that in embodiment 2 above, the mixing is executed at a temperature in the range of 80° C. to 220° C.

Embodiment 4

In some embodiments, such as any one of embodiments 1-3 above, the optional cross-linking agent is present, and cross-linking comprises exposing the blend composition to an elevated temperature in the range of 60° C. to 200° C. for at least 2 minutes and not more than 90 minutes.

Embodiment 5

In some embodiments, such as any one of embodiments 1-4 above, the additive material is present and the additive material comprises a blowing agent, and the foaming comprises decomposing the blowing agent to volatile components which foam the material upon release from the composition.

Embodiment 6

In some embodiments, such as any one of embodiments 1-5 above, foaming the cross-linked intermediate composition to form a foamed article comprises use of physical foaming with a supercritical fluid.

Embodiment 7

In some embodiments, such as any one of embodiments 1-6 above, the blend composition is processed before cross-linking, or both before and at least partially during cross-linking.

Embodiment 8

In some embodiments, such as embodiment 7 above, the processing comprises compression molding, injection molding, extrusion, or a combination thereof.

Embodiment 9

In some embodiments, such as any one of embodiments 1-8 above, a film is laminated to at least a portion of the exterior surface of the foamed article or material.

Embodiment 10

In some embodiments, such as embodiment 9 above, at least a portion of the portion or more of the exterior surface of the article or material to which the film is laminated is irradiated with low plasma discharge prior to the lamination of the film.

Embodiment 11

In some embodiments, such as any one of embodiments 1-10 above, the polyolefin comprises low density polyethylene, linear low density polyethylene, high density polyethylene, polypropylene, one or more copolymers thereof, or a blend thereof.

Embodiment 12

In some embodiments, such as any one of embodiments 1-11 above, the phase change material comprises n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, n-Heptadecane, n-Hexadecane, n-Pentadecane, n-Tetradecane, n-Tridecane, or a combination thereof.

Embodiment 13

In some embodiments, such as any one of embodiments 1-11 above, the weight:weight ratio of the phase change material to the polyolefin is in the range of 1:10 to 2:1.

Embodiment 14

Embodiments encompass an article comprising a cross-linked polyolefin, a phase change material having a lower weight average molecular weight than the weight average molecular weight of the polyolefin prior to cross-linking; and the article with a porosity of 35% to 98% by volume.

Embodiment 15

In some embodiments, such as that in embodiment 14 above, the polyolefin, prior to cross-linking, comprises low density polyethylene, linear low density polyethylene, high density polyethylene, polypropylene, one or more copolymers thereof, or a blend thereof.

Embodiment 16

In some embodiments, such as that in embodiment 14 or 15 above, the phase change material comprises n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, n-Heptadecane, n-Hexadecane, n-Pentadecane, n-Tetradecane, n-Tridecane, or a combination thereof.

Embodiment 17

In some embodiments, such as any one of embodiments 14-16 above, the weight:weight ratio of the phase change material to the polyolefin is in the range of 1:10 to 2:1.

Embodiment 18

In some embodiments, such as any one of embodiments 14-17 above the porosity of the article is between 50% and 85%.

Embodiment 19

In some embodiments, such as any one of embodiments 14-18 above, the average pore size is in the range of 100 to 200 μm.

Embodiment 20

In some embodiments, such as any one of embodiments 14-19 above, the thermal conductivity of the article is in the range of 0.07 to 0.12 W/(m*K).

EXAMPLES

The examples presented in this section are provided by way of illustration of the current invention only and are not intended nor are they to be construed as limiting the scope of this invention in any manner whatsoever.

The following abbreviations may be used in the Examples:

° C.=degrees Celsius (also known as Centigrade);
K=Kelvin (temperature);
g=grams;
min=minutes;
hr=hour;
hrs=hours;
m=meter;
zo cm=centimeter, $10^{-2}$ meter;
mm=millimeter, or $10^{-3}$ meter;
micron=micrometer, or $10^{-6}$ meter;
μm=micrometer, or $10^{-6}$ meter;
N=Newton;
J=joule;
mJ=millijoules=$10^{-3}$ joule; and
W=Watt.

Example

Foams were prepared from linear low density polyethylene (LLDPE, Lotrène® Q1018N, QAPCO, Qatar), paraffin wax (Rubitherm, Germany), blowing agent (Genitron® AC2, Schering Polymer Additives, England), and cross-linking agent (dicumylperoxide, SIGMA) in the multistep process. At first, all substances were mixed 5 minutes at 140° C. by Plasticorder Brabender®. Then the material was hot pressed for 3 min at with the platen of the press at 140° C. in a cylinder-shaped mold used to obtain a required shape and followed by further time period with the mold in the press with the platen at 140° C. for 13 minutes to perform cross-linking of the blend. During this process, blowing agent decomposed to volatile components, but due to the high pressure in the press the volatile components were not released from the blend before cross-linking. After cooling, the sample was removed from the mold and subsequently placed into an oven at 140° C. for a time period of 25 minutes to allow components originating from the blowing agent to release and to obtain the foamy material. The LLDPE/wax foam sample made was a weight:weight ratio of 70:30 LLDPE:wax.

The resulting foams were analyzed. Scanning electron microscopy (SEM, Nova NanoSEM 450, FEI, USA) was used to characterize the sample morphology. DSC (Differential Scanning calorimetry) measurements were performed using Perkin Elmer model DSC 8500 (Perkin Elmer, USA) over the temperature range from 0° C. to 60° C. using a heating rate 10° C. min$^{-1}$ under nitrogen atmosphere. The investigated parameters were collected from the second scan.

DMA (Dynamic Mechanical Analysis) testing in compression mode was performed by RSA-G2 (TA Instruments, USA). The samples were in form of the cylinder with 8 mm in diameter and 8 mm height. The initial preload for measurements were established at 0.02 N for 1 minute. Then all measurements were performed at linear viscoelastic range (LVR) established from the strain dependence of viscoelastic moduli.

The thermal conductivity of the fabricated samples was measured by a Hot Disk thermal analyzer (Hot Disk 2500, Sweden), using the transient place source (TPS) method based on a transient technique described in Coquarda et al., Internat. Journ. Therm. Sci. 65 (2013) 242-253. According to this method a disk-shaped TPS sensor is placed between two circular sample pieces.

The density of materials was determined gravimetrically.

The efficiency of cross-linking was determined gravimetrically in terms of the insoluble portion (gel) after 12 h extraction of the samples in boiling xylene.

Results

SEM Analysis

Figure 1A:
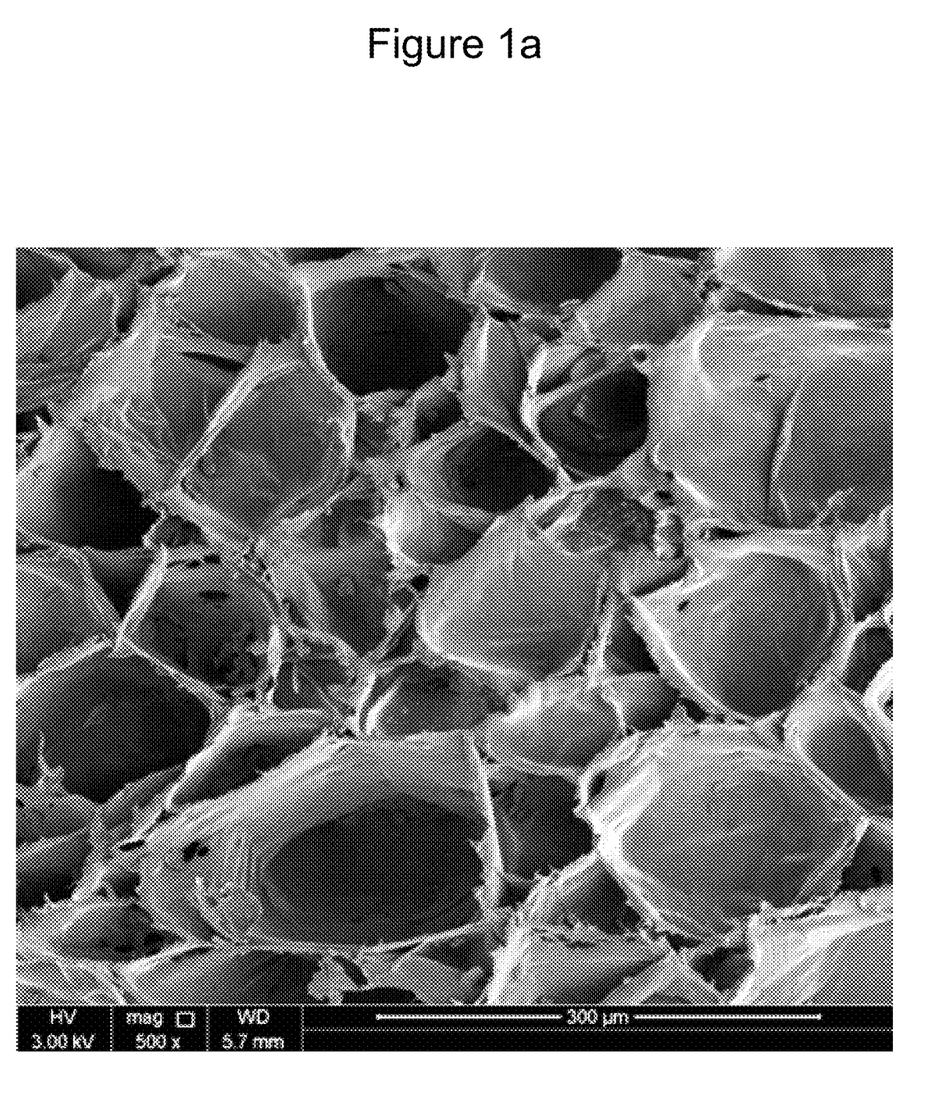
FIGS. 1a and 1b: SEM pictures of 1a—linear low density polyethylene (LLDPE) foam, and 1b—LLDPE/wax foam.
Figure 1B:
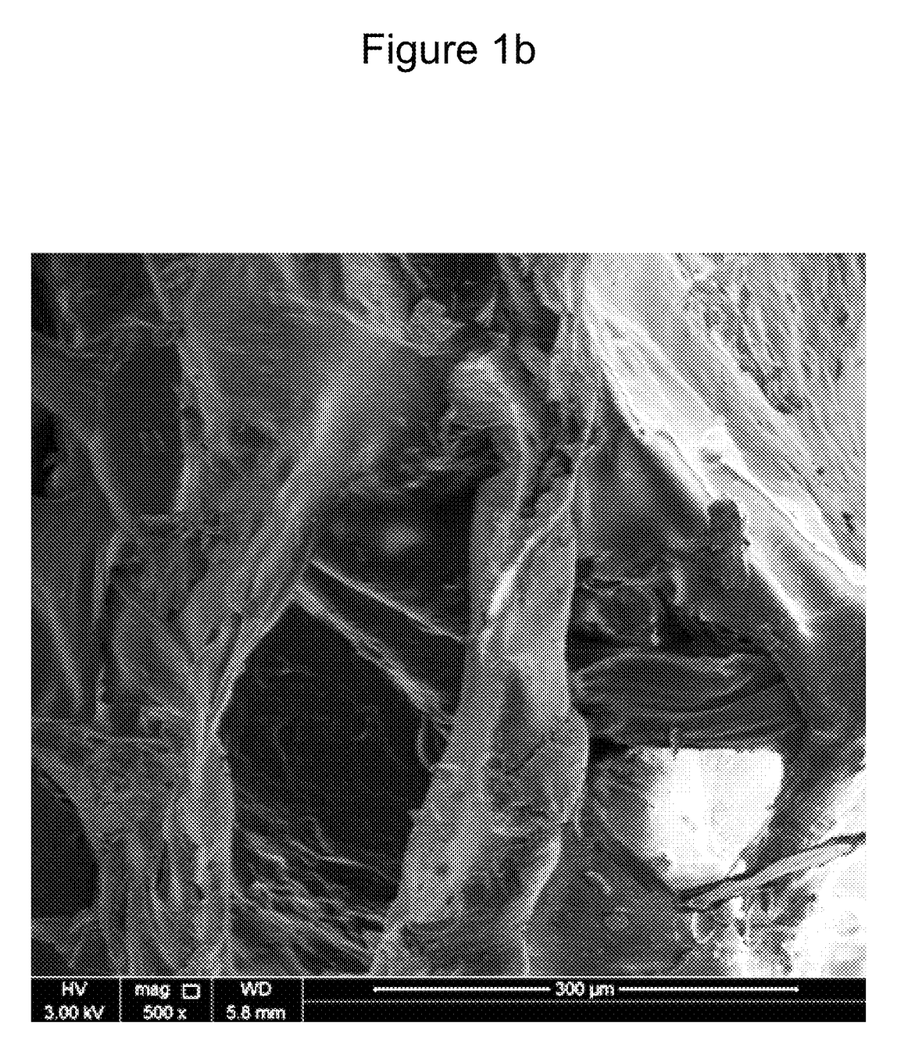

FIG. 1a shows relatively good distribution of formed pores of hexagonal shape in neat LLDPE foam with size varied approximately from 100 to 200 μm. It is also seen that some portion of wax is located in the pores in the LLDPE/wax foams (FIG. 1b).

Porosity

The density of foamed LLDPE and foamed LLDPE/Wax blend was estimated from the density measurement considering the additive rule for specific volume of mixtures. Volume portion of pores was calculated by following Equation 1:

$$\Phi_{pores}(\%) = \left[1 - \frac{\rho_{foamed}}{\rho_{unfoamed}}\right] * 100\% \quad (1)$$

where $\phi_{pores}$ represents volume percent pores, and $\rho_{unfoamed}$ and $\rho_{foamed}$ are densities of material before foaming and after foaming, respectively, and * represents multiplication.

The results are summarized in Table 1. It is seen that gel portion of cross-linked LLDPE is higher than gel portion of LLDPE/Wax blend. This is because that a proportional part of peroxide is distributed in both LLDPE and wax phases and thus an effective concentration of peroxide in LLDPE is lower than that one in the neat LLDPE. On the other hand, a low molecular wax is not cross-linked due to its short chains. The blends were cross-linked before blowing to suppress the collapse of the pores. This is common procedure for preparation of foamy polyethylene. The results of gel content measurements are summarized in Table 1.

TABLE 1

Densities of materials and volume potion of pores

| Sample | Density (g/cm$^3$) | $\Phi_{pores}$ (%) | Gel portion (wt. %) |
|---|---|---|---|
| LLDPE | 0.9410 | — | — |
| LLDPE/Wax | 0.9177 | — | — |
| LLDPE foam | 0.0763 | 92 | 81.1 |
| LLDPE/Wax foam | 0.2898 | 69 | 27.5 |

DSC Characterization

Figure 2:
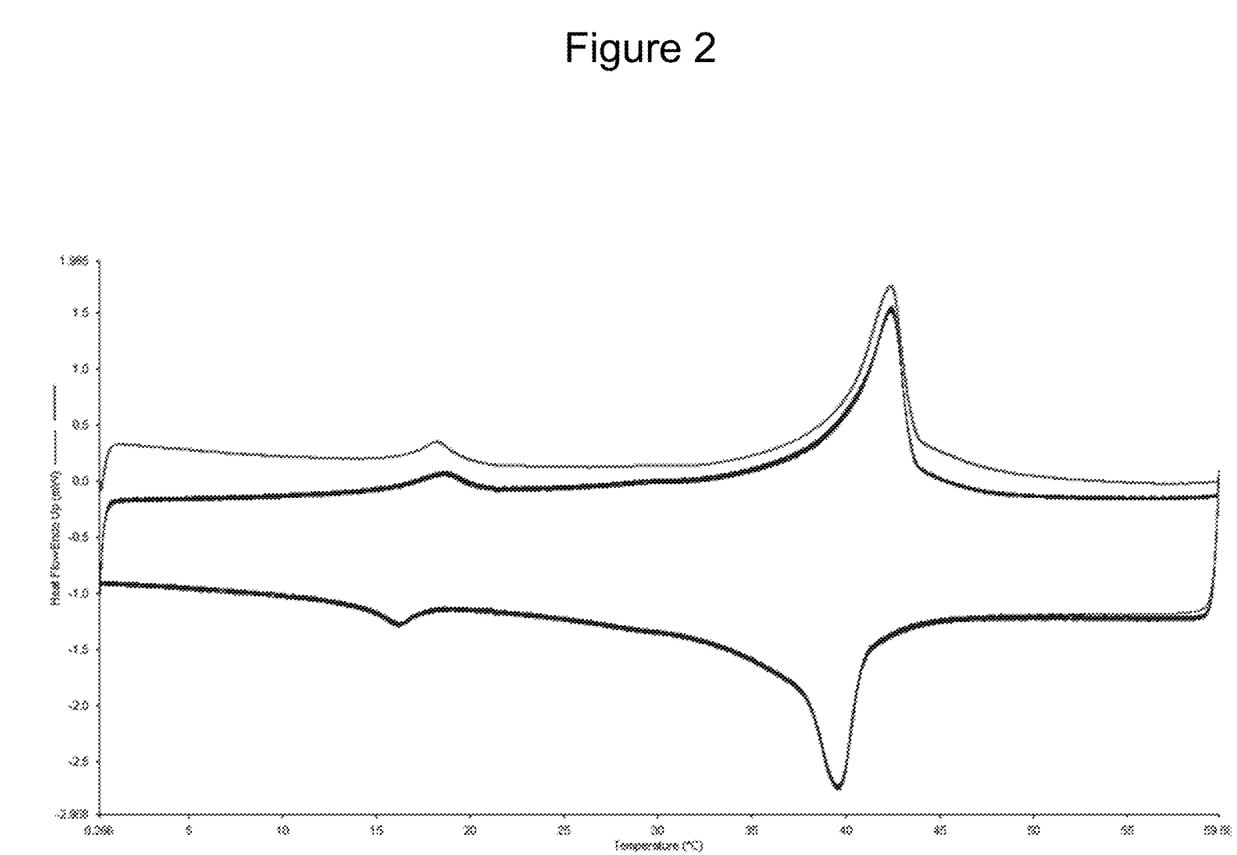
FIG. 2: Heat flux evolution of the LLDPE/Wax foam (y-axis, "Heat Flow Endo Up (mW)") vs. temperature (x-axis, "Temperature ° C.") as obtained from a differential scanning calorimetry experiment where the uppermost line represents the first heating step and remaining lines are the rest of the cooling and heating steps within the 20 cycles.

FIG. 2 demonstrates the ability of LLDPE/Wax foam to store and to release thermal energy without any change (except first heating cycle which removed the thermal history of sample preparation) over 20 heating and cooling cycles during cyclic variation of the temperature from 0° C. to 60° C. The main peak at temperature around 42° C. is attributed to solid-liquid transition of paraffin wax, whereas a minor peak at around 18° C. belongs to the solid-solid transition of wax phases.

TABLE 2

Determination of temperature for solid-solid ($T_{s-s}$) and solid-liquid transition ($T_{s-l}$), and the specific enthalpy of solid-solid ($\Delta H_{s-s}$) and solid-liquid transition ($\Delta H_{s-l}$), for the foam sample formed of LLDPE/Wax with the composition LLDPE/paraffin wax 70/30/w/w during cyclic variation of temperature from 0 to 60° C.

| | Heating | | | | Cooling | | | |
|---|---|---|---|---|---|---|---|---|
| No of Cycle | $T_{s-s}$ ° C. | $\Delta H_{s-s}$ J/g | $T_{s-l}$ ° C. | $\Delta H_{s-l}$ J/g | $T_{s-s}$ ° C. | $\Delta H_{s-s}$ J/g | $T_{s-l}$ ° C. | $\Delta H_{s-l}$ J/g |
| 1 | 18.2 | 1.4 | 42.4 | 23.0 | 16.2 | −1.2 | 39.6 | −21.7 |
| 2 | 18.7 | 1.4 | 42.4 | 20.9 | 16.2 | −1.3 | 39.6 | −21.4 |
| 10 | 18.7 | 1.4 | 42.4 | 21.2 | 16.2 | −1.3 | 36.6 | −21.8 |

DMA Analysis

Figure 3A:
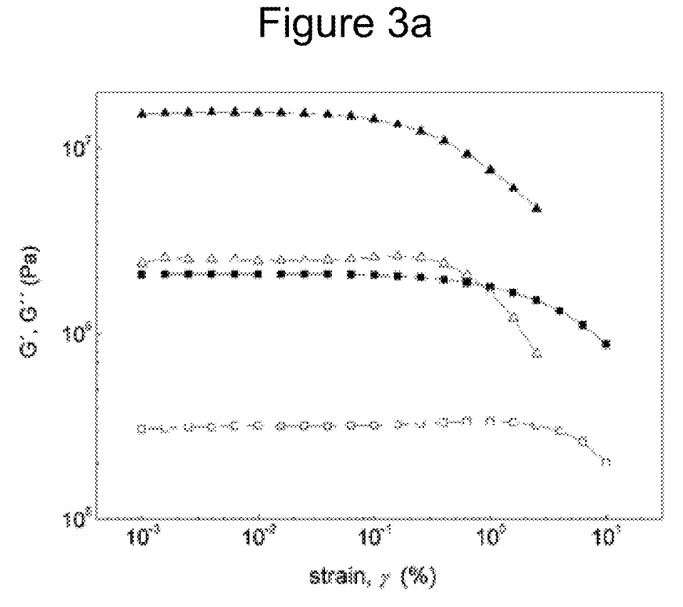
FIGS. 3a-3d: Dependence of the elastic modulus G' and loss modulus G" (Pa) on the y-axis against strain y (%) on the x-axis (FIG. 3a), against frequency on the x-axis (FIG. 3b), against temperature (° C.) on the x-axis (FIG. 3c), and dependence of tan d (δ) on the y-axis against temperature (° C.) on the x-axis (3d); where filled rectangles and filled triangles represent the elastic modulus for the first cycle of a LLDPE foam and a LLDPE/wax foam, respectively; the open rectangles and open triangles represent the loss modulus for the first cycle of the LLDPE foam and the LLDPE/wax foam, respectively; and the filled circles represent the elastic modulus for the cycles 2-20 of the LLDPE/wax foam.
Figure 3B:
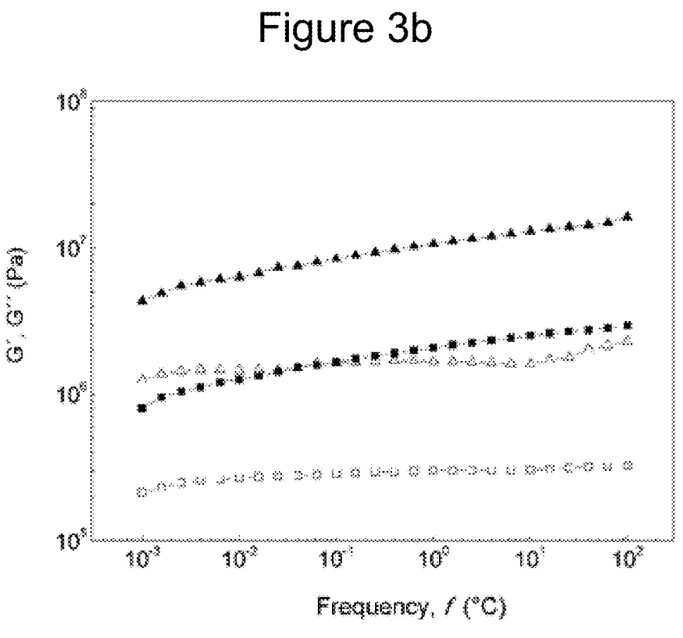
Figure 3C:
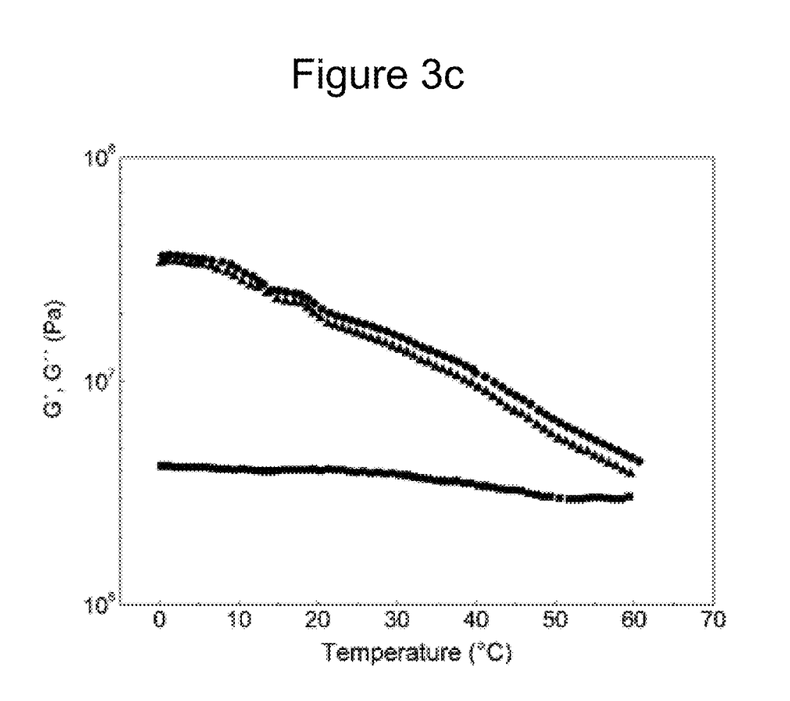
Figure 3D:
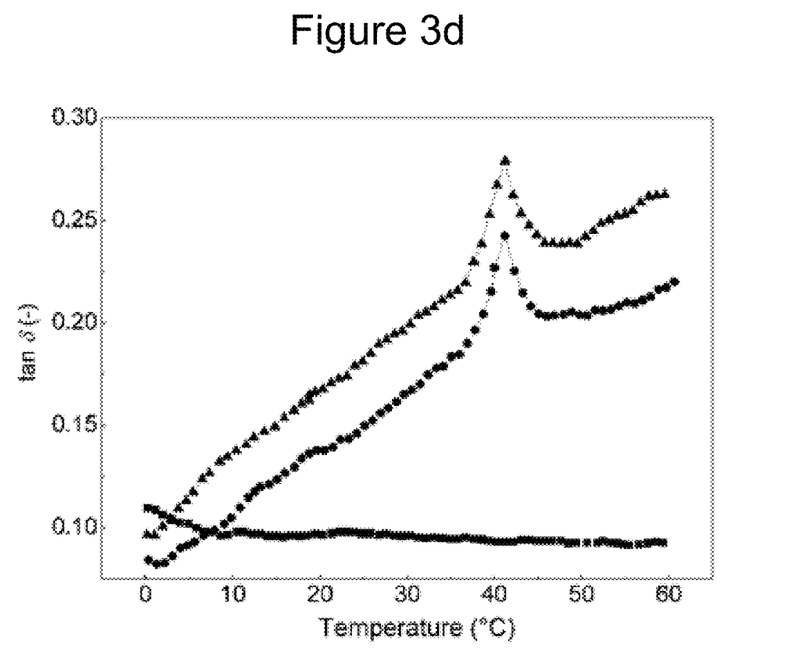
Figure 4:
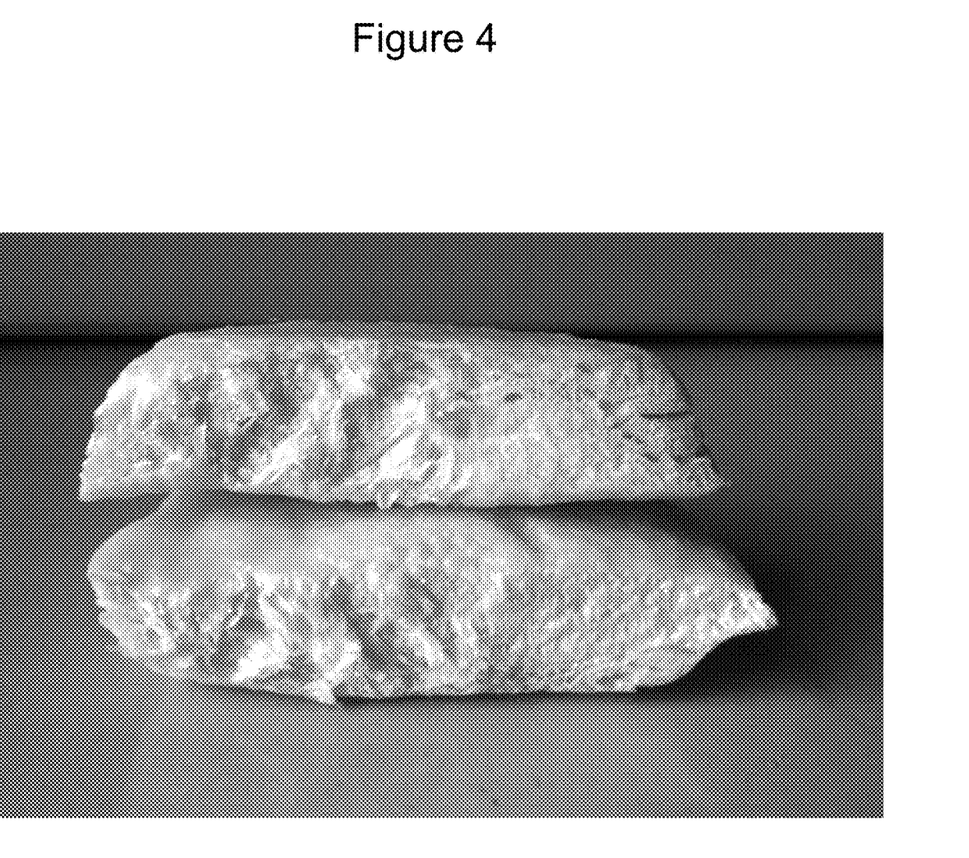
FIG. 4: A sample of the foam based on LLDPE and paraffin wax.

Dynamic mechanical properties of the prepared samples were investigated in the LVR (linear viscoelastic region), when the viscoelastic moduli are independent of the strain deformation (FIG. 3a). The LLDPE foam is stable to the higher deformations in comparison to the LLDPE/Wax foam due to the better structural properties. However, the absolute value of elastic modulus is higher for the LLDPE/Wax sample, indicating that this sample exhibits better mechanical behavior and is rather stiffer than pure LLDPE foam. As seen in FIG. 3b, for both samples the viscoelastic moduli slightly increases with increasing frequency, resulting from the good mechanical behavior of the samples. Since the material LLDPE is able to provide suitable properties for the higher strain deformation as was already mentioned, the LLDPE/Wax sample has higher values of the elastic modulus, and therefore also mechanical energy which can be stored in the material is higher. Furthermore, as can be seen in FIG. 3c, the LLDPE/Wax sample is more dependent on the temperature, resulting from the phase change of the wax within the measured temperature range, while the pure LLDPE sample does not exhibit this behavior and is stable. Finally, the FIG. 3d presents the peak in the tan δ at 42° C. This is the typical melting point of the Wax also obtained from the DSC evaluation. This peak clearly indicates the phase change of the prepared LLDPE/Wax foam material. In order to evaluate the quantitative amount of the energy from this phase transition, the mechanical properties in a wide temperature range and various frequencies (1, 2.5, 5 and 10 Hz) were measured. Using modified Arrhenius equation (see Ilcikova, M et al., *Polymer*, 55, 211-218 (2014); and Ilcikova, M, et al., *Polym. Adv. Technol.*, (2014) DOI: 0.10002/pat.3324.) the activation energy of phase change was quantified. This energy was calculated to be 428 kJ mol$^{-1}$.

Thermal Conductivity and Diffusivity

Thermal conductivity of LLDPE foam is 0.06 W/m K, whereas thermal conductivity of LLDPE/Wax foam is 0.09 W/m K, mainly due to lower porosity. Unfoamed blends exhibited thermal conductivity of LLDPE around 0.38 W/m K and adding paraffin wax caused that thermal conductivity to be decreased to 0.33 W/m K due to lower thermal conductivity of the wax than pure polyethylene (around 0.2 W/m K). Thermal diffusivity decreased from 0.27 mm$^2$ s$^{-1}$ for LLDPE foam to 0.22 mm$^2$ s$^{-1}$ for LLDPE/Wax foam.

Summary of Example

Foams of LLDPE/Wax containing of 30 wt. % of wax were successfully prepared. The volume % pores was 69 volume % and the foam prepared under the same conditions from LLDPE alone (without wax) consisted of 92 volume % pores. The thermal conductivity of LLDPE foam is 0.06 W/m K, whereas the thermal conductivity of LLDPE/Wax foam is 0.09 W/m K, mainly due to lower porosity. DSC and DMA measurements proved an excellent stability of materials under cyclic heating and dynamic mechanical stresses while the LLDPE/Wax foam materials' properties were sustained at the same level.

Accordingly, it is understood that the above description of the present invention is susceptible to considerable modifications, changes and adaptations by those skilled in the art, and that such modifications, changes and adaptations are intended to be considered within the scope of the present invention, which is set forth by the appended claims.

What is claimed is:

1. A method of manufacturing a foamed article or material, the method comprising:
    forming a blend composition, the blend composition comprising a polyolefin, a non-encapsulated paraffin wax, a cross-linking agent, and an optional additive material;
    executing an operation comprising cross-linking the polyolefin to form a cross-linked intermediate composition wherein the cross-linking results in a cross-linked portion in the range of 20 percent by weight to 35 percent by weight of the polyolefin;
    executing an operation comprising foaming the cross-linked intermediate composition to form a foamed article or material; and
    laminating a film to at least a portion of an exterior surface of the foamed article or material; wherein the thermal conductivity of the foamed article or material is in the range of 0.07 to 0.12 W/(m*K) and wherein the article or material does not change more than 10% after 20 temperature cycles as measured by differential scanning calorimetry (DSC) wherein each temperature cycle encompasses the transition temperature of the phase change material of the foamed article or material and at least 10° C. on each side.

2. The method of claim 1, wherein forming the blend composition comprising the polyolefin, the non-encapsulated paraffin wax, the cross-linking agent, and the additive material, if present, comprises mixing the polyolefin, the non-encapsulated paraffin wax, the cross-linking agent, and the additive material, if present, together until homogeneous or substantially homogeneous.

3. The method of claim 2, wherein the mixing is executed at a temperature in the range of 80° C. to 220° C.

4. The method of claim 1, wherein
    cross-linking comprises exposing the blend composition to an elevated temperature in the range of 60° C. to 200° C. for at least 2 minutes and not more than 90 minutes.

5. The method of claim 1, wherein the additive material is present and the additive material comprises a blowing agent, and the foaming comprises decomposing the blowing agent to volatile components which foam the material upon release from the composition.

6. The method of claim 1, wherein foaming the cross-linked intermediate composition to form the foamed article or material comprises the use of physical foaming with a supercritical fluid.

7. The method of claim 1, wherein the blend composition is processed before cross-linking.

8. The method of claim 7, wherein processing the blended composition comprises compression molding, injection molding, extrusion, or a combination thereof.

9. The method of claim 1, wherein at least the portion of the exterior surface of the article or material is irradiated with low plasma discharge prior to the lamination of the film to the portion of the exterior surface of the foamed article or material.

10. The method of claim 1, wherein the polyolefin comprises low density polyethylene, linear low density polyethylene, high density polyethylene, polypropylene, one or more copolymers thereof, or a blend thereof.

11. The method of claim 10, wherein the non-encapsulated paraffin wax comprises n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, n-Heptadecane, n-Hexadecane, n-Pentadecane, n-Tetradecane, n-Tridecane, or a combination thereof.

12. The method of claim 11, wherein the weight:weight ratio of the non-encapsulated paraffin wax to the polyolefin is in the range of 1:10 to 2:1.

13. An article comprising:
a cross-linked polyolefin network,
a non-encapsulated paraffin wax having a lower weight average molecular weight than the weight average molecular weight of the polyolefin prior to cross-linking;
a porosity of 35% to 98% by volume; and
wherein the article is characterized by (i) a cross-linked portion in the range of 20 percent by weight to 35 percent by weight of the polyolefin; (ii) thermal conductivity in the range of 0.07 to 0.12 W/(m*K); and, (iii) wherein the article does not change more than 10% after 20 temperature cycles as measured by differential scanning calorimetry (DSC) wherein each temperature cycle encompasses the transition temperature of the phase change material of the foamed article or material and at least 10° C. on each side.

14. The article of claim 13, wherein the polyolefin, prior to cross-linking, comprises low density polyethylene, linear low density polyethylene, high density polyethylene, polypropylene, one or more copolymers thereof, or a blend thereof.

15. The article of claim 14, wherein the non-encapsulated paraffin wax comprises n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, n-Heptadecane, n-Hexadecane, n-Pentadecane, n-Tetradecane, n-Tridecane, or a combination thereof.

16. The article of claim 15, wherein the weight:weight ratio of the non-encapsulated paraffin to the polyolefin is in the range of 1:10 to 2:1.

17. The article of claim 13, wherein the porosity of the article is between 50% and 85%.

18. The article of claim 13, wherein the average pore size is in the range of 100 to 200 μm.

* * * * *